(12) United States Patent
Couchman et al.

(10) Patent No.: US 10,180,129 B2
(45) Date of Patent: Jan. 15, 2019

(54) COORDINATED CONTROL OF A FLOATING WIND TURBINE

(71) Applicant: MHI VESTAS OFFSHORE WIND A/S, Aarhus N (DK)

(72) Inventors: Ian Couchman, London (GB); Robert Bowyer, London (GB)

(73) Assignee: MHI VESTAS OFFSHORE WIND A/S, Aarhus N (DK)

( * ) Notice: Subject to any disclaimer, the term of this patent is extended or adjusted under 35 U.S.C. 154(b) by 583 days.

(21) Appl. No.: 14/373,593

(22) PCT Filed: Jan. 9, 2013

(86) PCT No.: PCT/DK2013/050004
§ 371 (c)(1),
(2) Date: Jul. 21, 2014

(87) PCT Pub. No.: WO2013/110276
PCT Pub. Date: Aug. 1, 2013

(65) Prior Publication Data
US 2015/0147174 A1    May 28, 2015

Related U.S. Application Data

(60) Provisional application No. 61/651,015, filed on Jul. 4, 2012.

(30) Foreign Application Priority Data

Jan. 23, 2012 (DK) .................... 2012 70038

(51) Int. Cl.
*F03D 9/00* (2016.01)
*H02P 9/04* (2006.01)
(Continued)

(52) U.S. Cl.
CPC ............ *F03D 7/047* (2013.01); *B63B 1/107* (2013.01); *B63B 35/44* (2013.01); *B63B 39/03* (2013.01);
(Continued)

(58) Field of Classification Search
USPC .................................................. 290/44, 55
See application file for complete search history.

(56) References Cited

U.S. PATENT DOCUMENTS 4,037,552 A * 7/1977 Torroja .................... B63B 9/00
114/125
4,653,421 A * 3/1987 Ayers ..................... B63B 35/32
210/242.3
(Continued)

FOREIGN PATENT DOCUMENTS

GB    2442719 A    4/2008
JP    2005351087 A    12/2005
(Continued)

OTHER PUBLICATIONS

Danish Search Report for PA 2012 70038, dated Sep. 7, 2012.
International Search Report for PCT/DK2013/050004, dated Apr. 24, 2013.

*Primary Examiner* — Pedro J Cuevas
(74) *Attorney, Agent, or Firm* — Patterson + Sheridan, LLP

(57) ABSTRACT

The present invention relates to methods, apparatus and computer program products for coordinating the control of a floating wind turbine (101) between a wind turbine controller (111) and a platform controller (110). One or more wind turbine control systems and/or one or more platform control systems may be altered based on said coordinated control of said floating wind turbine (101).

30 Claims, 4 Drawing Sheets

(51) Int. Cl.
    *F03D 7/04*        (2006.01)
    *F03D 7/02*        (2006.01)
    *B63B 35/44*     (2006.01)
    *F03D 13/25*     (2016.01)
    *B63B 1/10*      (2006.01)
    *B63B 39/03*     (2006.01)
    *B63B 1/12*      (2006.01)

(52) U.S. Cl.
    CPC ............ *F03D 7/02* (2013.01); *F03D 7/0204* (2013.01); *F03D 7/026* (2013.01); *F03D 13/25* (2016.05); *B63B 2001/128* (2013.01); *B63B 2035/446* (2013.01); *B63B 2207/02* (2013.01); *F05B 2240/93* (2013.01); *F05B 2270/18* (2013.01); *Y02E 10/723* (2013.01); *Y02E 10/727* (2013.01)

(56) References Cited

U.S. PATENT DOCUMENTS

| | | | | |
|---|---|---|---|---|
| 5,271,350 | A * | 12/1993 | Newburger | B63B 25/082 114/74 A |
| 8,471,396 | B2 * | 6/2013 | Roddier | B63B 35/44 290/44 |
| 9,144,727 | B2 * | 9/2015 | Lochtefeld | B63B 35/85 |
| 9,797,376 | B2 * | 10/2017 | Bowyer | F03D 7/042 |
| 9,810,204 | B2 * | 11/2017 | Aubault | F03D 13/25 |
| 9,879,654 | B2 * | 1/2018 | Peiffer | F03D 7/048 |
| 2006/0165493 | A1 * | 7/2006 | Nim | B63B 35/44 405/223.1 |
| 2010/0003134 | A1 | 1/2010 | Edwards et al. | |
| 2011/0037264 | A1 * | 2/2011 | Roddier | B63B 35/44 290/44 |
| 2011/0074155 | A1 | 3/2011 | Scholte-Wassink | |
| 2011/0140420 | A1 * | 6/2011 | Loh | F03D 7/0224 290/44 |
| 2011/0140426 | A1 | 6/2011 | Garcia Lopez et al. | |
| 2011/0148115 | A1 | 6/2011 | Roznitsky et al. | |
| 2012/0294681 | A1 * | 11/2012 | Wong | F03D 9/17 405/224 |
| 2013/0099496 | A1 * | 4/2013 | Solheim | B63B 21/50 290/44 |
| 2013/0199433 | A1 * | 8/2013 | Lochtefeld | B63B 35/85 114/242 |
| 2013/0276691 | A1 * | 10/2013 | Thieffry | B63B 35/44 114/264 |
| 2014/0193259 | A1 * | 7/2014 | Borgen | F03D 11/04 416/85 |
| 2014/0339828 | A1 * | 11/2014 | Peiffer | F03D 7/048 290/44 |
| 2015/0211484 | A1 * | 7/2015 | Couchman | F03D 7/0204 416/1 |
| 2015/0211488 | A1 * | 7/2015 | Bowyer | F03D 7/02 416/1 |
| 2015/0275850 | A1 * | 10/2015 | Numajiri | F03D 80/88 290/55 |
| 2016/0123302 | A1 * | 5/2016 | Couchman | F03D 7/0224 416/1 |
| 2016/0369780 | A1 * | 12/2016 | Aubault | F03D 13/25 |
| 2017/0226984 | A1 * | 8/2017 | Gregory | F03B 13/1895 |
| 2018/0051677 | A1 * | 2/2018 | Aubault | B63B 39/06 |

FOREIGN PATENT DOCUMENTS

| | | |
|---|---|---|
| WO | 20091131826 A2 | 10/2009 |
| WO | 20101021655 A2 | 2/2010 |

* cited by examiner

COORDINATED CONTROL OF A FLOATING WIND TURBINE

The present invention relates to coordinated control of a floating wind turbine.

Wind turbines which effectively harness wind energy to generate electrical power are becoming increasingly popular as an alternative energy source to the traditional methods for generating electrical power. In order to generate a suitable magnitude of electrical power wind turbines are often co-located together in large groups referred to as wind farms. A wind farm may vary in size from tens of wind turbines up to hundreds of wind turbines.

Traditionally, wind farms have been located on land in areas where the available wind energy is suitable for consistent electrical power generation. However, as more wind farms are being erected then there are fewer suitable locations available on land which provide suitable wind flow (for example, wind flow not being affected by hills, woods, building, and so on) to enable a consistent level of electrical power generation. Furthermore, as wind farms may include hundreds of wind turbines then they may not be an aesthetically pleasing view on the landscape and may generate some level of noise in operation.

As such, there is now a move towards locating wind farms offshore, for example, in the sea, in lakes and so on. This has several advantages in that the wind flow is usually uninterrupted and they are away from populated areas.

Currently, wind turbines are very large and heavy structures which therefore require stable foundations. This is typically not a problem for wind turbines located on land but provides a challenge for wind turbines that are located offshore.

In shallow water each wind turbine may be mounted on or have foundations in the sea bed though, logistically, mounting the turbines to the sea bed is only possible in relatively shallow water, for example, up to water depths of 30 meters.

However, water depths up to 30 meters are generally close to the shore and as such would be a dominant sight close to the shore line along with being imposing due to the size and height of current wind turbines. In addition, the majority of offshore locations that are located close to large cities, the sea bed tends to drop off to depths of >100 m very quickly e.g. east coast of America.

Therefore, there is a move towards locating wind farms in deeper water much further offshore where it is impractical and expensive to implement foundations into the sea bed and as such it is envisaged that wind turbines will be set on floating platforms which may then be tethered to the sea bed.

There are several floating platform designs and concepts, one of which is a platform that includes one or more ballast tanks where the ballast tanks aim to restrict and/or control the inclination of the floating wind turbine. It is important to be able to maintain the wind turbine tower in a substantially vertical position and within a predefined inclination angle limit from the vertical in order to obtain the optimum electrical power from the wind energy and also for safety reasons to prevent the wind turbine effectively tipping over or performing an emergency shutdown due to the angle of inclination of the floating wind turbine.

Existing floating wind turbines are slow to counter inclinations of the floating wind turbine when various forces are acting on the wind turbine. In particular, floating wind turbines with active ballast systems (where ballast is distributed between or within one or ballast tanks) are slow to redistribute ballast to counter forces acting on the floating wind turbine to control the inclination of the floating wind turbine.

The present invention seeks to address, at least in part, some or all of the disadvantages and drawbacks described hereinabove.

According to a first aspect of the present invention there is provided a method comprising the steps of: coordinating control of a floating wind turbine between a wind turbine controller and a platform controller; and altering one or more wind turbine control systems and/or one or more platform control systems based on the coordinated control of the floating wind turbine.

The embodiments of the present invention therefore advantageously enable the coordinated control of a floating wind turbine between a wind turbine and a platform of the floating wind turbine. Coordinating the control of the floating wind turbine advantageously improves the efficiency, safety and loads of the floating wind turbine. The wind turbine control systems may include, for example, turbine blade pitch control, yaw system control, Variable Thrust Limiter control and so on. The platform control system may include an active ballast system.

The step of coordinating control may comprise the step of receiving and/or transmitting data between the wind turbine controller and the platform controller, wherein the data is indicative of one or more factors relating to a wind turbine and/or a platform of the floating wind turbine. Therefore, the coordinated control of the floating wind turbine may include sharing or communicating data relating to factors affecting the wind turbine and/or the platform. For example, the factors that may be affecting the wind turbine may include wind speed, wind direction, yaw position or angle, turbine blade pitch angle, and so on. The factors that may be affecting the platform include, for example, the tilt and roll of the platform, the metocean conditions, the ballast distribution, the inclination of the wind turbine, and so on.

The step of altering the wind turbine control systems and/or the platform control systems based on the coordinated control may further comprise the steps of determining the alteration to the wind turbine control system based on at least data indicative of one or more factors relating to the platform; and/or determining the alteration to the platform control system based on at least data indicative of one or more factors relating to the wind turbine. Therefore, the wind turbine control systems may be altered based on factors relating to the platform and vice versa.

The method may further comprise the steps of receiving at the wind turbine controller data corresponding to a wind speed and wind direction measurement; coordinating control of the floating wind turbine by transmitting the data corresponding to the wind speed and wind direction to the platform controller; and altering a ballast system of the platform by the platform controller based on the received data corresponding to the wind speed and wind direction. As such, the platform controller may alter the ballast system of the platform based on the wind speed and direction acting on the wind turbine. The altering of the ballast system may occur prior to or pre-emptively before the wind turbine starts up so that the platform may be aligned via the ballast system such that the forces acting on the wind turbine at startup counter the alignment of the platform. The altering of the ballast system may be determined by calculating a ballast distribution.

The method may further comprise the steps of identifying by the wind turbine controller that the wind turbine is to start up; and requesting by the wind turbine controller the data corresponding to a wind speed and wind direction measurement.

The method may further comprise the steps of determining by the platform controller a ballast distribution to counter an inclination of the floating wind turbine that will be caused by the wind speed and the wind direction acting upon the floating wind turbine.

The method may further comprise the steps of informing the wind turbine controller from the platform controller once the alteration of the ballast system has been completed or is within a predefined threshold of being completed. Therefore, the coordinated control may include the wind turbine being informed that the platform is ready for the startup of the wind turbine.

The method may further comprise the steps of receiving at the wind turbine controller data corresponding to a yaw error value; coordinating control of the floating wind turbine by transmitting the data corresponding to the yaw error value to the platform controller; and altering a ballast system of the platform by the platform controller based on the received data corresponding to the yaw error value.

The method may further comprise the step of identifying that the wind turbine is about to alter its yaw position based on the yaw error value. Therefore, the altering of the ballast system may be performed prior to or pre-emptively of the wind turbine altering its yaw position.

The method may further comprise the steps of determining by the platform controller a ballast distribution to counter an inclination of the floating wind turbine that will be caused by the wind turbine altering its yaw position. The ballast distribution in any of the embodiments may be determined from a lookup table, mathematical calculation or any other mechanism or technique.

The method may further comprise the step of informing the wind turbine controller from the platform controller once the alteration of the ballast system has been completed or is within a predefined threshold of being completed.

The method may further comprise the steps of receiving at the platform controller data relating to metocean conditions affecting the floating wind turbine; coordinating control of the floating wind turbine by transmitting the data corresponding to the metocean conditions to the wind turbine controller; and setting by the wind turbine controller a lower thrust limit based on at least the received data corresponding to the metocean conditions. As such, the wind turbine may change the thrust limit for the wind turbine based on factors affecting the platform such as, for example, the wave motion.

The method may further comprise the steps of receiving at the platform controller data relating to tilt and roll angles of the floating wind turbine; coordinating control of the floating wind turbine by transmitting the data corresponding to the tilt and roll angles to the wind turbine controller; and setting by the wind turbine controller a lower thrust limit based on at least the received data corresponding to the tilt and roll angles.

The turbine controller and the platform controller may be the same controller. Presently, in floating wind turbines the wind turbine is independently controlled by a wind turbine controller and the platform is independently controlled by a platform controller. However, in the future a single controller (or single group of controllers) may control the whole wind turbine and therefore the functionality of the wind turbine controller and the platform controller may be performed by a single controller and the embodiments of the coordinated control may be performed by the single controller.

The features and functions of the embodiments may be performed by the wind turbine controller, the platform controller or any combination thereof. For example, the determination of the ballast distribution may be performed by the platform controller or the wind turbine controller or any other controller. The order that the features and functions are performed is not limiting and may be performed in any order to achieve the coordinated control of the floating wind turbine.

According to a second aspect of the present invention there is provided a floating wind turbine comprising: a wind turbine controller and a platform controller wherein control is coordinated between the wind turbine controller and the platform controller; and means adapted to alter one or more wind turbine control systems and/or one or more platform control systems based on the coordinated control.

According to a third aspect of the present invention there is provided an apparatus adapted to: coordinate control of a floating wind turbine between a wind turbine controller and a platform controller; and alter one or more wind turbine control systems and/or one or more platform control systems based on the coordinated control. The apparatus may be a floating wind turbine.

The wind turbine controller and the platform controller may be adapted to receive and/or transmit data therebetween, wherein the data is indicative of one or more factors relating to a wind turbine and/or a platform of the floating wind turbine.

The means adapted to alter the wind turbine control systems and/or platform control systems based on the coordinated control may be further adapted to determine the alteration to the wind turbine control system based on at least data indicative of one or more factors relating to the platform; and/or determine the alteration to the platform control system based on at least data indicative of one or more factors relating to the wind turbine. The means may be the wind turbine controller and/or the platform controller.

The wind turbine controller may be adapted to receive data corresponding to a wind speed and wind direction measurement; the wind turbine controller may be further adapted to coordinate control of the floating wind turbine by transmitting the data corresponding to the wind speed and wind direction to the platform controller; and the platform controller may be adapted to alter a ballast system of the platform based on the received data corresponding to the wind speed and wind direction.

The wind turbine controller may be further adapted to identify that the wind turbine is to start up; and the wind turbine controller may be further adapted to request the data corresponding to a wind speed and wind direction measurement.

The platform controller may be further adapted to determine a ballast distribution to counter an inclination of the floating wind turbine that will be caused by the wind speed and the wind direction acting upon the floating wind turbine.

The platform controller may be further adapted to inform the wind turbine controller once the alteration of the ballast system has been completed or is within a predefined threshold of being completed.

The wind turbine controller may be further adapted to receive data corresponding to a yaw error value; the wind turbine controller may be further adapted to coordinate control of the floating wind turbine by transmitting the data corresponding to the yaw error value to the platform controller; and the platform controller may be further adapted to alter a ballast system of the platform based on the received data corresponding to the yaw error value.

The wind turbine controller may be further adapted to identify that the wind turbine is about to alter its yaw position based on the yaw error value.

The platform controller may be further adapted to determine a ballast distribution to counter an inclination of the floating wind turbine that will be caused by the wind turbine altering its yaw position.

The platform controller may be further adapted to inform the wind turbine controller once the alteration of the ballast system has been completed or is within a predefined threshold of being completed.

The platform controller may be further adapted to receive data relating to metocean conditions affecting the floating wind turbine; the platform controller may be further adapted to coordinate control of the floating wind turbine by transmitting the data corresponding to the metocean conditions to the wind turbine controller; and the wind turbine controller may be further adapted to set a lower thrust limit based on at least the received data corresponding to the metocean conditions.

The platform controller may be further adapted to receive data relating to tilt and roll angles of the floating wind turbine; the platform controller may be further adapted to coordinate control of the floating wind turbine by transmitting the data corresponding to the tilt and roll angles to the wind turbine controller; and the wind turbine controller may be further adapted to set a lower thrust limit based on at least the received data corresponding to the tilt and roll angles.

The turbine controller and the platform controller may be the same controller.

The apparatus, controllers and or floating wind turbine may be adapted to implement any or all of the above features and functions by software, hardware or any combination thereof. The features and functions of the embodiments may be performed by the wind turbine controller, the platform controller or any combination thereof. For example, the determination of the ballast distribution may be performed by the platform controller or the wind turbine controller or any other controller. The order that the features and functions are performed is not limiting and may be performed in any order to achieve the coordinated control of the floating wind turbine.

According to a fourth aspect of the present invention there is provided a computer program product comprising computer readable executable code for: coordinating control of a floating wind turbine between a wind turbine controller and a platform controller; and altering one or more wind turbine control systems and/or one or more platform control systems based on the coordinated control of the floating wind turbine.

The computer program product may further comprise computer readable executable code for implementing or performing any or all of the features and functions of the aspects of the present invention.

According to a fifth aspect of the present invention there is provided a method comprising the steps of: receiving at a wind turbine controller data corresponding to a wind speed and wind direction measurement; coordinating control of a floating wind turbine by transmitting the data corresponding to the wind speed and wind direction to a platform controller; and altering a ballast system of a platform of the floating wind turbine by the platform controller based on the received data corresponding to the wind speed and wind direction.

There may be provided an apparatus and a computer program product for implementing the fifth aspect of the present invention.

According to a sixth aspect of the present invention there is provided a method comprising the steps of: receiving at a wind turbine controller data corresponding to a yaw error value; coordinating control of a floating wind turbine by transmitting the data corresponding to the yaw error value to a platform controller; and altering a ballast system of a platform of the floating wind turbine by the platform controller based on the received data corresponding to the yaw error value.

There may be provided an apparatus and a computer program product for implementing the sixth aspect of the present invention.

According to a seventh aspect of the present invention there is provided a method comprising the steps of: receiving at a platform controller data relating to metocean conditions affecting a floating wind turbine; coordinating control of the floating wind turbine by transmitting the data corresponding to the metocean conditions to a wind turbine controller; and setting by the wind turbine controller a lower thrust limit based on at least the received data corresponding to the metocean conditions.

There may be provided an apparatus and a computer program product for implementing the seventh aspect of the present invention.

According to an eighth aspect of the present invention there is provided a method comprising the steps of: receiving at a platform controller data relating to tilt and roll angles of a floating wind turbine; coordinating control of the floating wind turbine by transmitting the data corresponding to the tilt and roll angles to a wind turbine controller; and setting by the wind turbine controller a lower thrust limit based on at least the received data corresponding to the tilt and roll angles.

There may be provided an apparatus and a computer program product for implementing the eighth aspect of the present invention.

According to a ninth aspect of the present invention there is provided a wind turbine controller comprising: an input/output adapted to coordinate control of a floating wind turbine with a platform controller; and a processor adapted to alter one or more wind turbine control systems based on the coordinated control of the floating wind turbine.

According to a tenth aspect of the present invention there is provided a platform controller comprising: an input/output adapted to coordinate control of a floating wind turbine with a wind turbine controller; and a processor adapted to alter one or more platform control systems based on the coordinated control of the floating wind turbine.

Embodiments will now be described, by way of example only, and with reference to the accompanying figures, in which.

Figure 1:
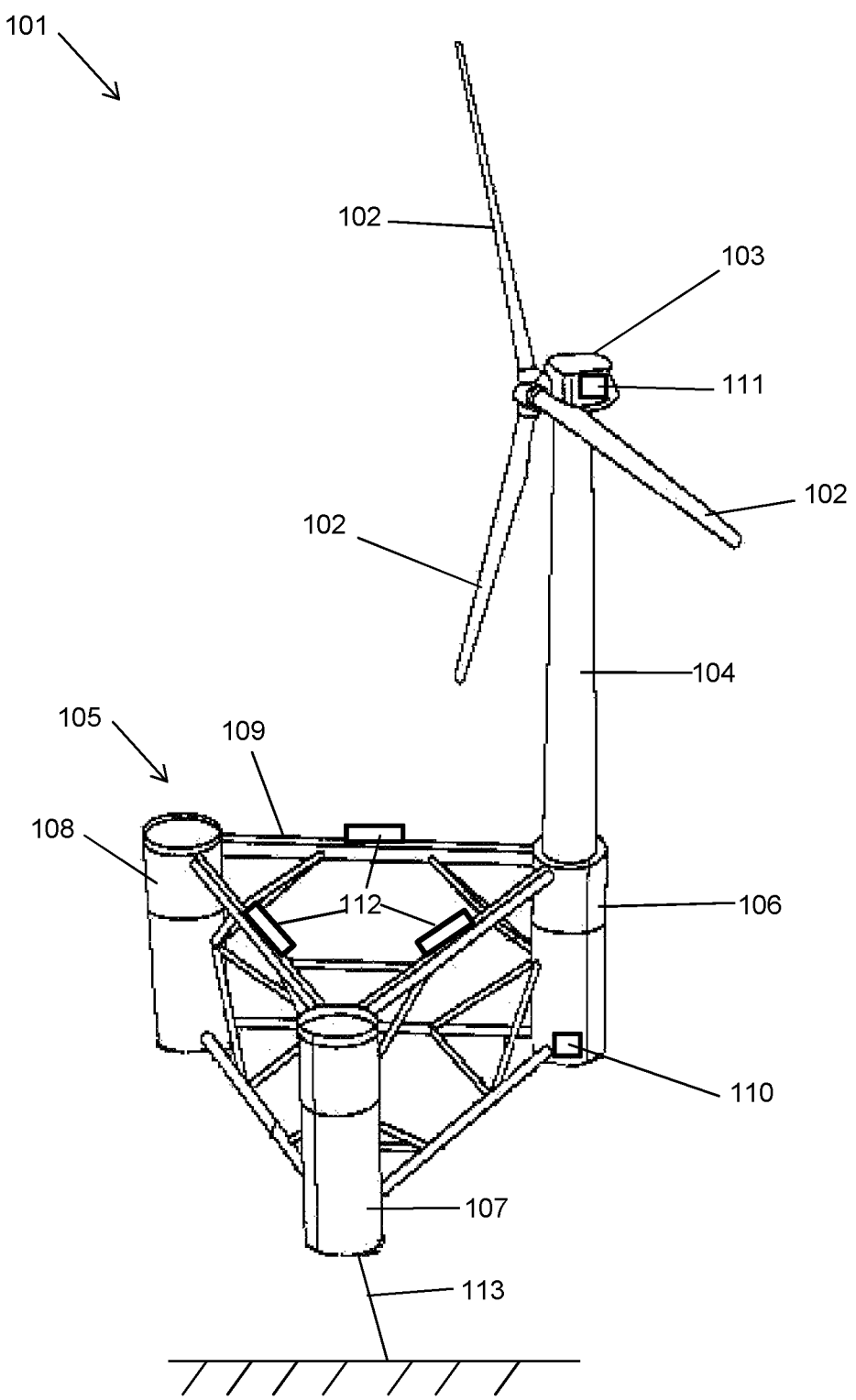
FIG. 1 shows a block diagram of a floating wind turbine in accordance with embodiments of the present invention.

A floating wind turbine 101 is shown in FIG. 1, which includes turbine blades 102 coupled to a nacelle 103. In FIG. 1, three turbine blades 102 are shown however, as will be appreciated, the number of turbine blades 102 is dependent on the design of the wind turbine and may include one or more turbine blades 102. Also, FIG. 1 shows a horizontal axis turbine blade arrangement however, as will be appreciated, the wind turbine may alternatively or additionally include a vertical axis turbine blade arrangement. Furthermore, the design of the wind turbine may alternatively or additionally include so-called upwind and/or downwind wind turbine designs.

The nacelle 103 is mounted on a tower 104. Typically, the nacelle 103 will house the floating wind turbine's 101 electrical generator, gearbox, drive shafts, and other electrical and mechanical equipment (not shown in FIG. 1) in order to generate electrical power from the kinetic energy of the wind. As will be appreciated, the required electrical and mechanical equipment may alternatively or part of the required electrical and mechanical equipment additionally, be located in the tower 104, on a corresponding floating platform 105, or at another location.

Accurately aligning the nacelle 103 into the wind leads to the generation of maximum electrical power and therefore the nacelle 103 may also house a pitch control system and a yaw control system which may be controlled by one or more wind turbine controllers 111.

The mechanism for controlling the pitch of the turbine blades in order to alter the rotational speed of the turbine blades 102 and for controlling the yaw system to direct the nacelle 103 into the wind are known in the art and will not be explained in detail.

In order to determine the wind speed and direction so as to be able to position the nacelle 103 at the optimal point, the wind turbine controller 111 may receive measurements from an anemometer sensor, such as and ultra-sonic sensor, a Light Detection and Ranging (LiDAR) device, and so on, either located on the nacelle 103, in a hub, on/in turbine blades, on a separate tower, etc., and operatively connected to the wind turbine controller 111. The wind turbine controller 111 may utilize the measurements to determine the appropriate pitch and yaw for the floating wind turbine 101. Techniques for the detection of the wind speed and direction for a wind turbine are well known in the art and so will not be explained in detail.

In FIG. 1, the floating platform 105 comprises three support columns 106, 107, 108 and the tower 104 is mounted on support column 106. The use of three supporting columns for a floating wind turbine is considered the optimal number given the trade-off between stability and cost.

However, as will be appreciated, the design of the floating platform may comprise one or more support columns and the embodiments are not limited to a floating platform 105 with three support columns 106, 107, 108. Also in FIG. 1, the tower 104 is shown in an asymmetrical position being mounted on one of the support columns however, as will be appreciated, the tower 104 may be mounted in a symmetrical position on a suitable support structure at the centre of the arrangement of support columns, or similarly at any other location on the floating platform 105.

The floating platform 105 may also be tethered or anchored to the sea bed by means of mooring lines or cables 113. The floating platform 105 may be anchored such that it remains in the same location or may be anchored such that the floating platform may have a degree of freedom, for example, up to approximately 15 meters.

The floating platform 105 may further include any other stabilization design feature, for example, water entrapment plates, which may increase the stability of the floating platform 105 when deployed offshore in deep water.

The support columns 106, 107, 108 are interconnected by a frame 109 to provide rigidity and stability to the floating platform 105.

In order to provide a stable foundation for the floating wind turbine 101 in the embodiments the floating platform 105 includes an active ballast system. The active ballast system effectively moves ballast between and/or within the supporting columns (where the supporting columns may include one or more ballast tanks) in order to maintain the wind turbine in a substantially vertical position. The ballast may be maintained and altered inside each of the supporting columns 106, 107, 108, e.g. a weight, gas, and so on, or the ballast may be moved between the supporting columns, e.g. water, gas, and so on, via a pumping mechanism.

In the embodiments of the present invention, the active ballast system comprises a water ballast system wherein water is pumped between the three supporting columns via conduits or pipes attached to or within the frame 109 of the floating platform 105.

A platform controller 110 may be located in one of the three supporting columns 106, 107, 108, located on the frame 109, or be operatively connected to the floating platform 105. The platform controller 110 may control the active ballast system, which in the embodiments is a water ballast system, to pump the appropriate amount of water ballast between the three support columns in order to counter forces acting on the floating wind turbine 101 and to maintain the wind turbine tower 104 in a substantially vertical orientation. The floating platform 105 may include one or more tilt and/or roll sensors 112 which measure the tilt and/or roll of the floating wind turbine 101. The platform controller 110 will activate the pumps to move the water ballast between the supporting columns based on the measurements from the tilt and/or roll sensors 112 in order to adjust the water volumes (and therefore the ballast) in each of the supporting columns. Each of the supporting columns 106, 107, 108 may have sensors that measure the amount of water in each of the supporting columns and communicate the measurement information to the platform controller 110.

In order to alter the ballast of the floating wind turbine 101 to counter forces acting on the floating wind turbine 101, a substantial quantity of water ballast will need to be moved between the supporting columns 106, 107, 108. Due to the quantity of water ballast to be moved or pumped between columns the response time for the active ballast system is fairly slow and up to 30 minutes to move the required water ballast and compensate for the forces acting upon the floating wind turbine 101.

In the embodiments, the active ballast system is a closed loop system in which the water ballast is isolated from the surrounding sea water. A closed loop system helps prevent flooding of the floating platform which may result in the sinking of the platform. However, as will be appreciated, the embodiments of the present invention are not limited to closed loop ballast systems.

Presently, the turbine controller 111 and the platform controller 110 are independent of each other wherein they control their aspect of the floating wind turbine 101. The only link between the two systems is in the case that the active ballast system is shut down as this will trigger the safety systems on the floating wind turbine to also shut down the turbine to ensure that no forces from operational use of the turbine cause the floating wind turbine to incline further than the allowed safety margins.

As described hereinabove, the platform controller 110 moves ballast around the platform in order to regulate the platform inclination to substantially zero to maintain the floating wind turbine in a substantially vertical position. The platform controller receives measurements from tilt and roll sensors attached to the floating platform in order to determine the corrective amount of ballast movement to counter the current forces acting on the floating wind turbine causing the floating wind turbine to tilt or incline away from the vertical position.

As such, the ballast effectively provides a counterweight to the floating wind turbine and therefore, by altering the ballast distribution in the supporting columns the inclination angle of the wind turbine tower can be controlled to counter the wind and sea forces acting on the floating wind turbine.

In order to increase the efficiency and effectiveness of the floating wind turbine, the embodiments of the present invention describe various mechanisms for the coordinated control of the wind turbine and the floating platform.

The wind turbine controller(s) and platform controller(s) coordinate the control of the floating wind turbine and alter one or more wind turbine control systems and/or one or more platform control systems based on the coordinated control of the floating wind turbine. This has several advantages, including that the optimal position for electrical generation may be maintained for longer and load on the wind turbine may be reduced.

The wind turbine controller and the platform controller may coordinate control by receiving and/or transmitting (e.g. communicating) data between the wind turbine controller and the platform controller, wherein the data is indicative of one or more factors relating to a wind turbine and/or a platform of said floating wind turbine. The coordinated control may further determine the alteration to the wind turbine control system based on at least data indicative of one or more factors relating to said platform; and/or determining the alteration to the platform control system based on at least data indicative of one or more factors relating to said wind turbine. Therefore, the control of various systems on the floating wind turbine is coordinated between the platform and the wind turbine.

When a wind turbine "starts-up" and the turbine blades start to rotate, a large force and moment will act on the floating wind turbine causing it to lean or incline away from the wind direction, assuming that on start-up the turbine blades are directed into the wind. A wind turbine typically starts operating when the wind speed into the turbine blades is above approximately 3 meters per second.

In existing floating wind turbines with active ballast control the response time for altering the distribution of the ballast is slow so that when the wind turbine starts up, during which it is subjected to a large thrust force, the active ballast system is unable to counter the start-up force quickly which can lead to large inclinations of the floating wind turbine that may cause an emergency safety shut-down if the inclination is above the predefined safety maximum inclination.

In the embodiments, the wind turbine, and in particular the wind turbine controller, is aware of the time at which the wind turbine may start-up. The wind turbine controller will either detect that the wind speed has reached the minimum wind speed in order to start up automatically and/or may receive an instruction or a command to start up from an operator, other wind turbine, or any other system.

Figure 2:
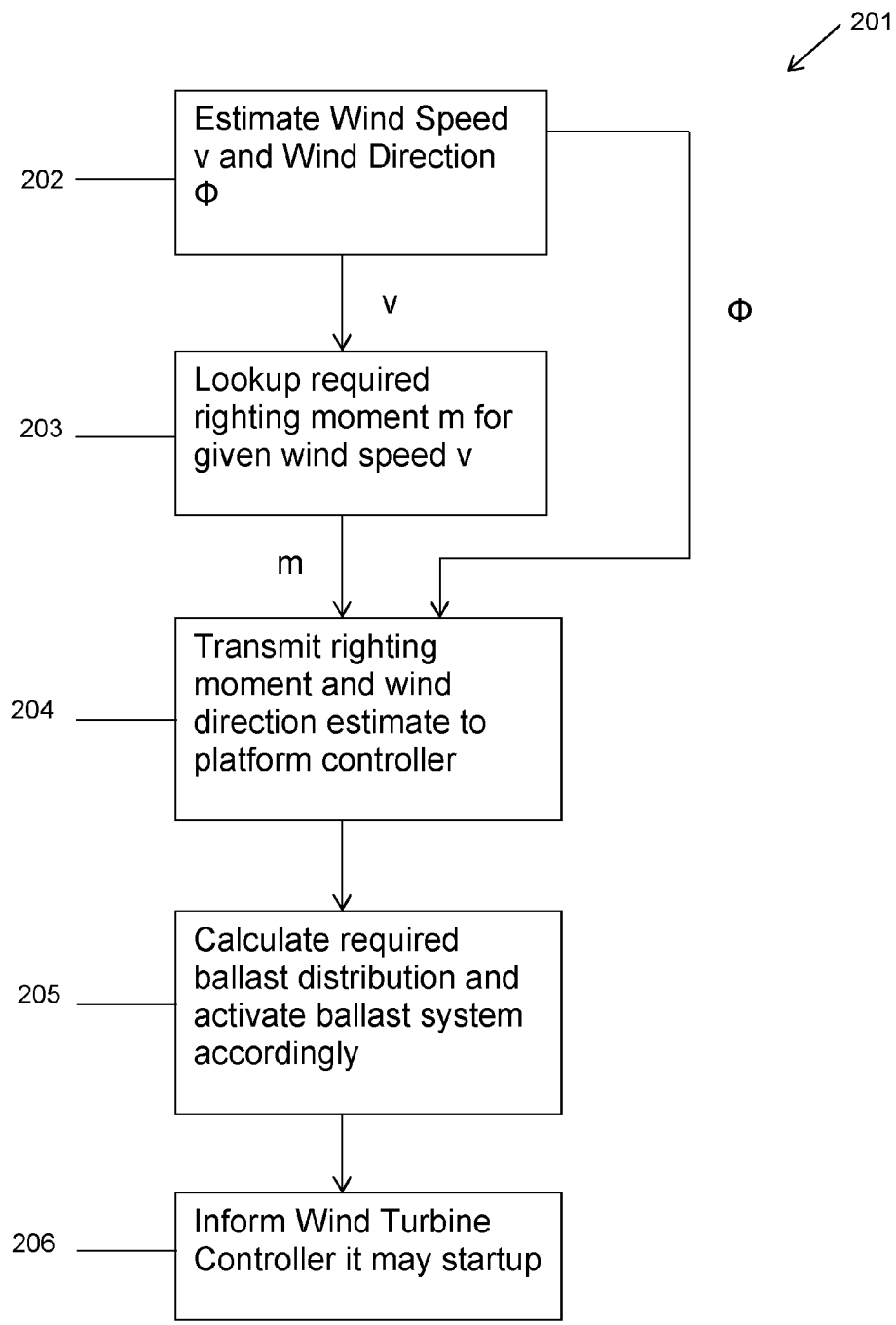
FIG. 2 shows a flow chart in accordance with the embodiments of the present invention.

With reference to FIG. 2 which shows a flowchart 201, an example of coordinated control relating to the start-up of a floating wind turbine will now be described.

Prior to starting up the wind turbine and therefore allowing the turbine blades to rotate in order to generate electrical power, the turbine controller determines an estimate of the wind speed and the wind direction 202.

The turbine controller may receive wind speed and direction measurements or estimations from sensors (e.g. a LiDAR device) attached to the wind turbine. Additionally or alternatively, the turbine controller may receive the wind speed and direction measurements/estimates from sensors attached to other wind turbines, to separate sensing means, and so on, where the sensors/sensing means are operatively connected to the turbine controller.

In step 203 the turbine controller determines a required righting moment for the floating platform based on at least the estimate for the wind speed determined in step 202. In this example, the righting moment for the floating platform can be determined via a lookup table, e.g.

| Wind Speed (ms$^{-1}$) | Moment (MNm) |
|---|---|
| 10 | 30 |
| 12 | 35 |
| 14 | 25 |
| 16 | 20 |

The above table is simply an example and is not limiting nor are the values stated in the table are necessarily real-life values or accurate values. As will be appreciated, the righting moment may be determined via many different methods and mechanisms such as mathematical calculation, historical logs, and so on.

In step 204, the wind turbine controller communicates with the platform controller in order to coordinate the control of the floating wind turbine. In this example, the wind turbine controller transmits the righting moment and estimated wind direction to the platform controller.

In step 205 the platform controller calculates the approximate ballast distribution in the active ballast system based on at least the righting moment determined in step 203 and on the estimate of the wind direction determined by the controller in step 202. Alternatively, the righting moment identified in step 203 may be determined based on both wind speed and direction and the righting moment provided to the platform controller to calculate the ballast distribution therefrom.

The ballast distribution is calculated in order to ensure that the righting moment will be applied in the correct direction (e.g. into the wind). The ballast distribution may be calculated to optimize overall system performance (e.g. total self-power consumption), using mathematical formula, lookup tables, and so on. The righting moment can be further converted to a feed forward signal to the closed loop ballast control system to improve the dynamic response of the system.

The platform controller then proceeds in step 205 to activate the ballast system to pump water ballast between the supporting columns according to the calculated ballast distribution. The platform controller will distribute the ballast and the floating platform will begin to incline or tilt into the wind so that when the wind turbine starts up the wind forces acting on the floating wind turbine counter the inclination of the wind turbine that the ballast system is moving the floating wind turbine to.

As part of the coordinated control between the wind turbine controller and the platform controller, the platform controller will be aware that it is performing a pre-emptive distribution of ballast meaning that the floating wind turbine will start to incline and that the platform controller is not to perform a correction of the pre-emptive ballast distribution even though the platform tilt and roll sensors will be providing measurements that the floating platform is inclining away from the substantially vertical position. The platform controller may follow a reference signal from the wind turbine controller or may perform the pre-emptive ballast distribution until informed otherwise, either by the wind turbine controller or by a safety system that the floating wind turbine will not be starting up. The platform controller may then take the necessary steps to activate the ballast system to redistribute the ballast accordingly in order to align the floating wind turbine substantially vertically.

In step 206 the platform controller identifies or determines when the ballast distribution matches the required calculated ballast distribution and communicates with the turbine controller to inform the turbine controller that the wind turbine can start-up. The platform controller may inform the turbine controller that the wind turbine can start either when the ballast has been completely distributed or when the ballast is within a predefined amount (e.g. 80%, 90%, and so on) of the required ballast distribution.

The turbine controller then initiates the startup of the wind turbine. As the ballast has been distributed and the floating platform will be inclined from the vertical position then the large start up forces that act on the wind turbine will counter the inclination of the floating platform.

In the above example, the platform controller received the calculated approximate ballast distribution and activated the ballast system to distribute the ballast accordingly. Alternatively or additionally, the platform controller may receive the tilt and/or alignment angles that the floating turbine is to be set at. In other words, at step 203 the tilt and/or roll angles may be identified from, for example, a lookup table based on the wind speed and provided to the platform controller. The platform controller may then determine the ballast distribution in order to ensure that the floating platform moves to an orientation described by the target tilt and/or roll angles and utilize the tilt and roll sensor measurements on the floating platform to identify whether the floating platform is at the required orientation.

The coordinated control of the wind turbine and floating platform may also occur during the operation of the floating wind turbine in order to improve and increase the efficiency, effectiveness and operation of the floating wind turbine.

Figure 3:
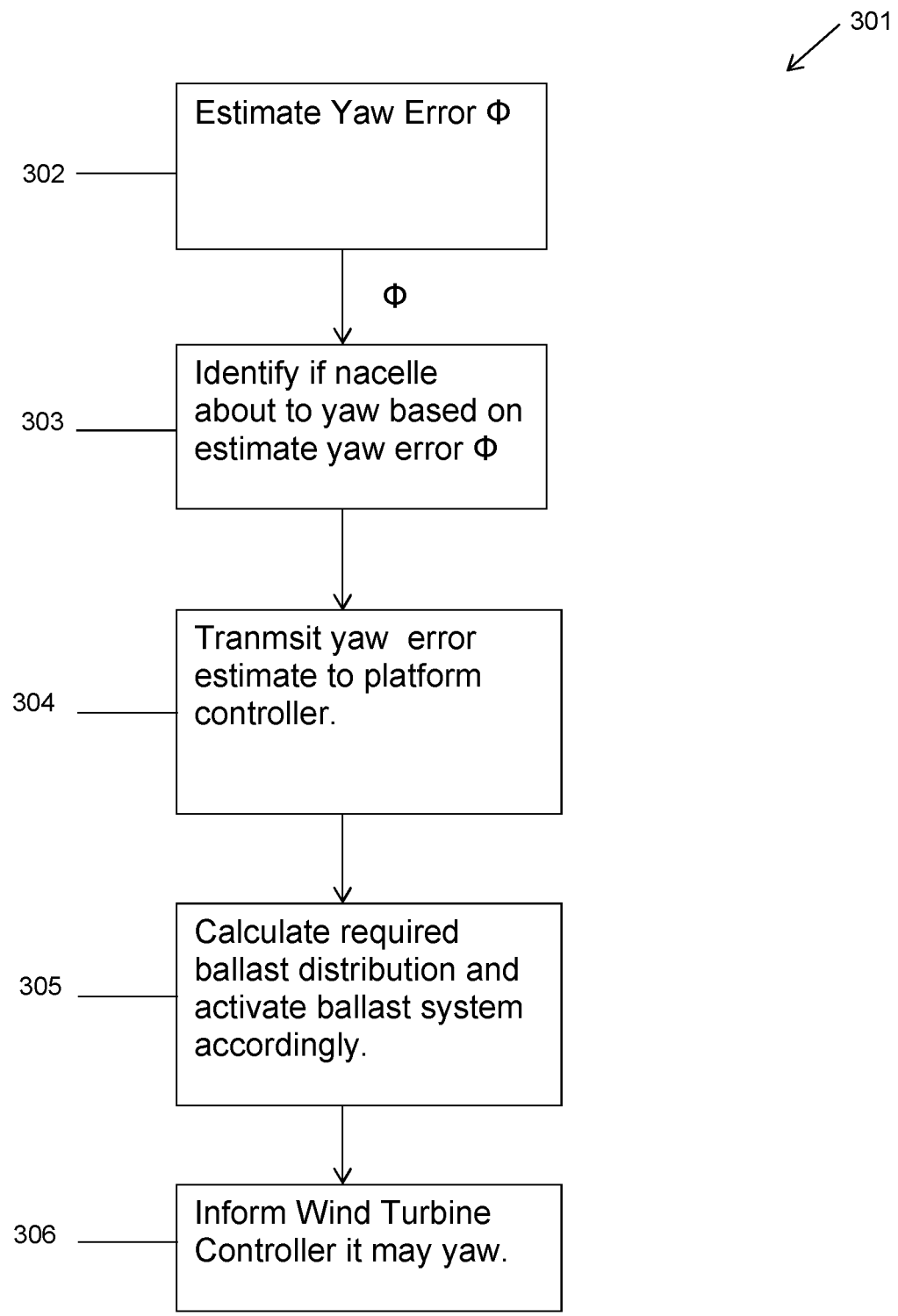
FIG. 3 shows a flow chart in accordance with the embodiments of the present invention.

With reference to FIG. 3, which shows a flowchart 301, an example will now be described in relation to the yaw system of a wind turbine. Wind turbine yaw systems are used to alter the angle between wind turbine nacelle (and therefore the turbine blades) and the wind direction. Modern wind turbines have an automatic yaw system which alters the direction of the nacelle such that the turbine blades are orientated into the wind to provide the maximum electrical power generation and minimum loads.

In step 302, the turbine controller estimates the yaw error, for example, based on the turbine blades bending moments, sensors, and so on. If the yaw error is estimated to be at or over a predetermined or predefined angle then the yaw system moves the nacelle to face into the wind.

In step 303, the turbine controller, based on at least the yaw error estimate, identifies that the yaw error is approaching the predefined error angle and as such the nacelle will soon be instructed to move into the wind direction. Alternatively, the turbine controller identifies that the yaw error estimate is at the predefined angle and as such will be instructing the nacelle to move into the wind direction.

In step 304, the turbine controller, prior to instructing the nacelle to move, communicates with the platform controller such that the active ballast system can be operated in order to prepare for the change in forces acting on the floating wind turbine once the nacelle begins to yaw.

The turbine controller may communicate or transmit the yaw error to the platform controller such that the platform controller may determine the ballast distribution necessary for the projected new position or alignment of the nacelle based on the yaw error of the nacelle.

Alternatively or additionally, the wind turbine controller may determine a righting moment based on at least the yaw error, or may calculate the necessary tilt and/or roll angles for the platform and communicate those to the platform controller.

The required ballast distribution or required tilt and/or roll of the platform may be determined via a lookup table and/or via mathematical calculations by the platform controller.

In step 305, the platform controller activates the ballast system accordingly such that the platform will tilt and/or roll in a manner that will be countered by the forces acting on the wind turbine once the nacelles yaws.

In step 306, the platform controller communicates to the turbine controller that the ballast has been distributed, or is within a predefined values of the required ballast distribution, to match the proposed new yaw alignment of the nacelle so that the turbine controller may then instruct the nacelle to yaw into the wind direction.

As part of the coordinated control between the wind turbine controller and the platform controller, the platform controller will be aware that it is performing a pre-emptive distribution of ballast meaning that the floating wind turbine will start to incline and that the platform controller is not to perform a correction of the pre-emptive ballast distribution even though the platform tilt and roll sensors will be providing measurements that the wind turbine is inclining away from the substantially vertical position. The platform controller may follow a reference signal from the wind turbine controller or may perform the pre-emptive ballast distribution until informed otherwise, either by the wind turbine controller or by a safety system that the nacelle will not yaw. The platform controller may then take the necessary steps to activate the ballast system to redistribute the ballast accordingly in order to align the floating wind turbine substantially vertically.

Figure 4:
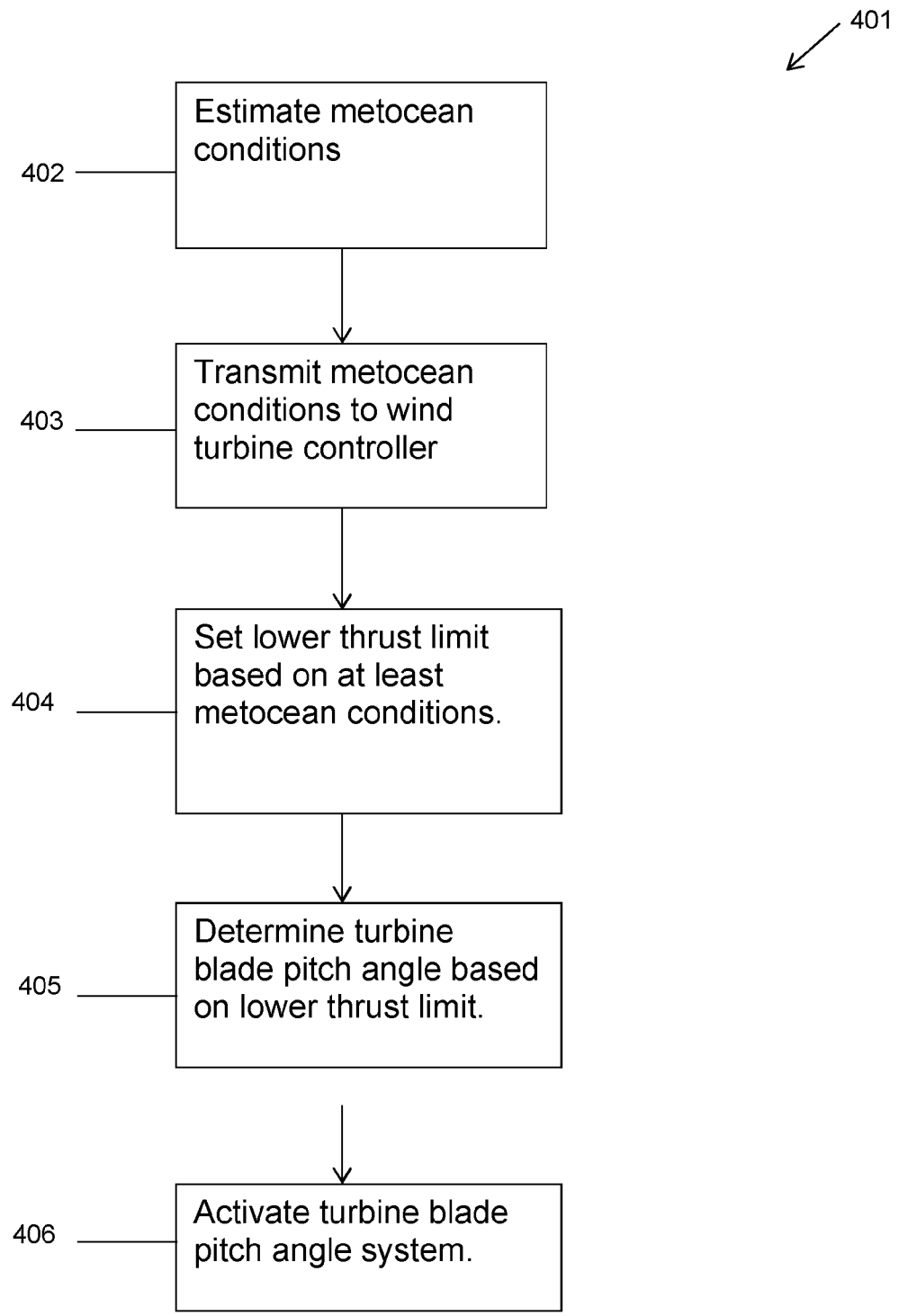
FIG. 4 shows a flow chart in accordance with the embodiments of the present invention.

With reference to FIG. 4, which shows a flowchart 401, an example will now be described in relation to utilizing and expanding a variable thrust limiter to include wave forces acting upon the floating wind turbine.

Some wind turbines presently include a Variable Thrust Limiter (VTL) which is a control feature utilized to alter the thrust force acting on the wind turbine. The axial force on the wind turbine blades is transferred from the blade arrangement to the nacelle and is directed along the axis of rotation of the rotor. This is the thrust force from the turbine blades and it may be positive or negative at different times during the operation of the wind turbine. The thrust force is typically a function of wind speed, (ii) pitch angle of the turbine blades, and rotor (or generator) rotations per minute (rpm).

The function of the VTL is to limit the thrust to be below a maximum value where the turbine controller can alter the maximum value depending on the operating conditions of the wind turbine. The turbine controller estimates the rotor thrust from measurements of the power, the generator rpm and the pitch angle of the turbine blades and calculates a pitch angle of the turbine blades that ensures the thrust is below a specified limit. Typically, in present wind turbines the thrust VTL is mainly activated during high wind turbulence in order to avoid peak loads on the turbine blades and the tower.

However, the inventors have identified that for floating wind turbines the VTL can be improved by coordinated control between the turbine controller and the platform controller. As the floating platform will rise and fall due to wave motion and movement then in high waves it may be useful to limit the thrust force on the wind turbine so as to prevent the inclination of the floating wind turbine (due to the wave motion and the aerodynamic force) from being greater than the predetermined or predefined safety angle of inclination which would cause an emergency shutdown of the wind turbine.

In step 402, the platform controller estimates the metocean conditions affecting the platform. The metocean conditions may be identified from platform data (e.g. from sensors attached to the platform), from wave buoys, from tower top sensors (e.g. accelerometers), and so on. The platform may additionally or alternatively identify other platform data such as the inclination of the floating wind turbine, the tilt and/or roll angles of the platform, and so on.

In step 403, the platform controller communicates the metocean and/or inclination data to the turbine controller so that this data may be taken into account in the VTL control system.

In step 404, the wind turbine controller, implementing the VTL control, may determine whether a lower thrust limit is necessary based on one or more of the metocean data, the inclination data of the floating wind turbine, the wind speed, generator rpm, pitch angle of the turbine blades, and so on. If a lower thrust limit is required then the lower thrust limit may be set by the VTL by, for example, a lookup table.

Based on the lower thrust limit determined in step 404, the turbine controller calculates or determines in step 405 the required turbine blade pitch angle and/or electrical torque, which, in the conditions acting on the floating wind turbine, will limit the thrust to the lower thrust limit.

In step 406, the turbine controller activates the pitch control system in order to set the pitch of the turbine blades to the angle determined in step 405.

In another example of the coordinated control for use with a VTL control system, the platform controller may receive measurements from tilt and roll sensors on the floating wind turbine and if the inclination is greater than a predefined or predetermined value, for example if the inclination is greater than 5°, then the platform controller may communicate with the turbine controller to request that a lower thrust limit is set in the VTL control system to enable the platform controller time to move ballast between the supporting columns in order to counter the present inclination of the floating wind turbine.

The above described examples show how the coordinated control of a floating wind turbine can improve existing floating wind turbines.

The examples given above, e.g. coordinated control during the startup of the wind turbine, coordinated VTL, coordinated yaw control, and so on, may all be implemented or used independently or one or more of the examples may be implemented together. As such, any combination of the examples may be implemented on a floating wind turbine.

By coordinating control of the floating wind turbine between the wind turbine and the platform then the wind turbine may be positioned in the optimal position for generating electrical power for longer and may also reduce the loads on the floating wind turbine. For example, in the case of distributing the ballast to counter the expected forces on the floating wind turbine once the floating wind turbine starts up then the wind turbine will be in the optimal position for generating electrical power earlier than if no pre-emptive ballast distribution had been performed. Also by coordinating control of the floating wind turbine then it is much less likely that the floating wind turbine will incline from the vertical greater than the predefined safety angle thereby reducing the possibility of an emergency shutdown.

In the above examples, there are one or more wind turbine controllers and one or more platform controllers which coordinate to improve the control of the floating wind turbine. This mirrors the present arrangement in having separate wind turbine controllers and platform controllers. Also, in the above examples, the wind turbine controllers and the platform controllers perform certain tasks and functions however, either of the controllers may perform any of the tasks or functions as required and the embodiments of the present invention are not limited to the order or controller performing the tasks or functions in each of the examples and embodiments. The main advantage of the embodiments is that the conditions affecting the wind turbine and/or conditions affecting the platform are taken into account, e.g. coordinated control, when controlling different systems on the floating wind turbine.

However, as will also be appreciated in the future there may only be one controller that controls all systems on a floating wind turbine. In this case, coordinated control is then performed by the single controller and the examples given above may still be implemented.

While preferred embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

What is claimed is:

1. A method for use with a floating wind turbine system comprising a wind turbine coupled with a floating platform, the method comprising:
    receiving, at a wind turbine controller, wind speed data and wind direction data;
    communicating, from the wind turbine controller to a platform controller, first data indicative of one or more factors relating to power production of the wind turbine, wherein the first data includes the wind speed data and the wind direction data;
    controlling operation of one or more platform control systems using the first data, wherein controlling operation of the one or more platform control systems comprises adjusting a ballast distribution of a ballast system of the floating platform responsive to the wind speed data and to the wind direction data;
    communicating, from the platform controller to the wind turbine controller, second data indicative of one or more factors relating to operation of the floating platform; and
    controlling operation of one or more wind turbine control systems using the second data.

2. The method as claimed in claim 1, further comprising:
    identifying, using the wind turbine controller, that the wind turbine is going to start up; and
    requesting, prior to the start up of the wind turbine, the wind speed data and the wind direction data using the wind turbine controller.

3. The method as claimed in claim 1, further comprising:
determining, using the wind speed data and the wind direction data, an inclination of the floating platform resulting from wind acting upon the floating wind turbine system,
wherein adjusting the ballast distribution of the ballast system comprises:
determining the ballast distribution to counter the inclination of the floating platform.

4. The method as claimed in claim 1, wherein communicating the second data comprises:
informing the wind turbine controller when adjusting the ballast distribution is completed or is within a predefined threshold of being completed.

5. The method as claimed in claim 1, wherein the wind turbine controller and the platform controller are a same controller.

6. A method for use with a floating wind turbine system comprising a wind turbine coupled with a floating platform, the method comprising:
receiving, at a wind turbine controller, yaw error value data;
communicating, from the wind turbine controller to a platform controller, first data indicative of one or more factors relating to power production of the wind turbine, wherein the first data includes the yaw error value data;
controlling operation of one or more platform control systems using the first data, wherein controlling operation of the one or more platform control systems comprises adjusting a ballast distribution of a ballast system of the floating platform responsive to the yaw error value data;
communicating, from the platform controller to the wind turbine controller, second data indicative of one or more factors relating to operation of the floating platform; and
controlling operation of one or more wind turbine control systems using the second data.

7. The method as claimed in claim 6, further comprising:
identifying, using the yaw error value data, that the wind turbine is going to alter its yaw position,
wherein adjusting the ballast distribution is performed prior to the wind turbine altering its yaw position.

8. The method as claimed in claim 6, further comprising:
determining, using the yaw error value data, an inclination of the floating platform resulting from the wind turbine altering its yaw position,
wherein adjusting the ballast distribution of the ballast system comprises:
determining the ballast distribution to counter the inclination of the floating platform.

9. The method as claimed in claim 6, wherein communicating the second data comprises:
informing the wind turbine controller when adjusting the ballast distribution is completed or is within a predefined threshold of being completed.

10. A method for use with a floating wind turbine system comprising a wind turbine coupled with a floating platform, the method comprising:
receiving, at a platform controller, metocean condition data relating to metocean conditions affecting the floating platform;
communicating, from the platform controller to a wind turbine controller, first data indicative of one or more factors relating to operation of the floating platform, wherein the first data includes the metocean condition data;
controlling operation of one or more wind turbine control systems using the first data, wherein controlling operation of the one or more wind turbine control systems comprises setting a lower thrust limit for the wind turbine based at least on the metocean condition data;
communicating, from the wind turbine controller to the platform controller, second data indicative of one or more factors relating to power production of the wind turbine; and
controlling operation of one or more platform control systems using the second data.

11. A method for use with a floating wind turbine system comprising a wind turbine coupled with a floating platform, the method comprising:
receiving, at a platform controller, tilt and roll angle data affecting the floating platform;
communicating, from the platform controller to a wind turbine controller, first data indicative of one or more factors relating to operation of the floating platform, wherein the first data includes the tilt and roll angle data; and
controlling operation of one or more wind turbine control systems using the first data, wherein controlling operation of the one or more wind turbine control systems comprises setting a lower thrust limit for the wind turbine based at least on the tilt and roll angle data;
communicating, from the wind turbine controller to the platform controller, second data indicative of one or more factors relating to power production of the wind turbine; and
controlling operation of one or more platform control systems using the second data.

12. A floating wind turbine system comprising:
a wind turbine coupled with a floating platform; and
a wind turbine controller and a platform controller that are capable of providing coordinated control of the wind turbine and the floating platform,
wherein the wind turbine controller is operable to:
receive wind speed data and wind direction data; and
communicate, to the platform controller, first data indicative of one or more factors relating to power production of the wind turbine, wherein the first data includes the wind speed data and the wind direction data,
wherein the platform controller is operable to:
control operation of one or more platform control systems using the first data, wherein controlling operation of the one or more platform control systems comprises adjusting a ballast distribution of a ballast system of the floating platform responsive to the wind speed data and to the wind direction data; and
communicate, to the wind turbine controller, second data indicative of one or more factors relating to operation of the floating platform; and
wherein the wind turbine controller is further operable to control operation of one or more wind turbine control systems using the second data.

13. The floating wind turbine system as claimed in claim 12, wherein the wind turbine controller is further operable to:
identify that the wind turbine is going to start up; and
request, prior to the start up of the wind turbine, the wind speed data and the wind direction data.

14. The floating wind turbine system as claimed in claim 12, wherein the platform controller is further operable to:
   determine, using the wind speed data and the wind direction data, an inclination of the floating platform resulting from wind acting upon the floating wind turbine system,
   wherein adjusting the ballast distribution of the ballast system comprises:
      determining the ballast distribution to counter the inclination of the floating platform.

15. The floating wind turbine system as claimed in claim 12, wherein communicating the second data comprises:
   informing the wind turbine controller when adjusting the ballast distribution is completed or is within a pre-defined threshold of being completed.

16. The floating wind turbine system as claimed in claim 12, wherein the wind turbine controller and the platform controller are a same controller.

17. A floating wind turbine system comprising:
   a wind turbine coupled with a floating platform; and
   a wind turbine controller and a platform controller that are capable of providing coordinated control of the wind turbine and the floating platform,
   wherein the wind turbine controller is operable to:
      receive yaw error value data; and
      communicate, to the platform controller, first data indicative of one or more factors relating to power production of the wind turbine, wherein the first data includes the yaw error value data;
   wherein the platform controller is operable to:
      control operation of one or more platform control systems using the first data, wherein controlling operation of the one or more platform control systems comprises adjusting a ballast distribution of a ballast system of the floating platform responsive to the yaw error value data; and
      communicate, to the wind turbine controller, second data indicative of one or more factors relating to operation of the floating platform, and
   wherein the wind turbine controller is further operable to control operation of one or more wind turbine control systems using the second data.

18. The floating wind turbine system as claimed in claim 17, wherein the wind turbine controller is further operable to:
   identify, using the yaw error value data, that the wind turbine is going to alter its yaw position,
   wherein adjusting the ballast distribution is performed prior to the wind turbine altering its yaw position.

19. The floating wind turbine system as claimed in claim 17, wherein the platform controller is further operable to:
   determine, using the yaw error value data, an inclination of the floating platform resulting from the wind turbine altering its yaw position,
   wherein adjusting the ballast distribution of the ballast system comprises:
      determining the ballast distribution to counter the inclination of the floating platform.

20. The floating wind turbine system as claimed in claim 17, wherein communicating the second data comprises:
   informing the wind turbine controller when adjusting the ballast distribution is completed or is within a pre-defined threshold of being completed.

21. A floating wind turbine system comprising:
   a wind turbine coupled with a floating platform; and
   a wind turbine controller and a platform controller that are capable of providing coordinated control of the wind turbine and the floating platform,
   wherein the platform controller is operable to:
      receive metocean condition data relating to metocean conditions affecting the floating platform; and
      communicate, to the wind turbine controller, first data indicative of one or more factors relating to operation of the floating platform, wherein the first data includes the metocean condition data,
   wherein the wind turbine controller is operable to:
      control operation of one or more wind turbine control systems using the first data, wherein controlling operation of the one or more wind turbine control systems comprises setting a lower thrust limit for the wind turbine based at least on the metocean condition data; and
      communicate, to the platform controller, second data indicative of one or more factors relating to power production of the wind turbine, and
   wherein the platform controller is further operable to control operation of one or more platform control systems using the second data.

22. A floating wind turbine system comprising:
   a wind turbine coupled with a floating platform; and
   a wind turbine controller and a platform controller that are capable of providing coordinated control of the wind turbine and the floating platform,
   wherein the platform controller is operable to:
      receive tilt and roll angle data affecting the floating platform; and
      communicate, to the wind turbine controller, first data indicative of one or more factors relating to operation of the floating wind turbine, wherein the first data includes the tilt and roll angle data; and
   wherein the wind turbine controller is operable to:
      control operation of one or more wind turbine control systems using the first data, wherein controlling operation of the one or more wind turbine control systems comprises setting a lower thrust limit for the wind turbine based at least on the tilt and roll angle data; and
      communicate, to the platform controller, second data indicative of one or more factors relating to power production of the wind turbine, and
   wherein the platform controller is further operable to control operation of one or more platform control systems using the second data.

23. A non-transitory computer program product comprising computer readable executable code for use with a floating wind turbine system comprising a wind turbine coupled with a floating platform, wherein the computer readable executable code configures one or more computer processors to perform an operation comprising:
   receiving wind speed data and wind direction data;
   communicating, to a platform controller, first data that is indicative of one or more factors relating to power production of the wind turbine, wherein the platform controller is operable to control operation of one or more platform control systems using the first data, wherein controlling operation of the one or more platform control systems comprises adjusting a ballast distribution of a ballast system of the floating platform responsive to the wind speed data and to the wind direction data;

receiving, from the platform controller, second data indicative of one or more factors relating to operation of the floating platform; and controlling operation of one or more wind turbine control systems using the second data.

24. A method for use with a floating wind turbine system comprising a wind turbine coupled with a floating platform, the method comprising:

receiving, at a wind turbine controller, data that is indicative of one or more factors affecting operation of the wind turbine;

coordinating control of the floating wind turbine system by transmitting, to a platform controller, coordination data that is based at least on the received data, wherein the platform controller is configured to alter a ballast system of the floating platform based on the coordination data; and receiving, from the platform controller, authorization data for the wind turbine to perform a predefined operation, wherein the authorization data indicates that the ballast system is within a predefined amount of a predefined ballast distribution for the predefined operation.

25. The method of claim 24, wherein the one or more factors comprise a wind speed and a wind direction.

26. The method of claim 25, wherein the predefined operation comprises a startup operation.

27. The method of claim 25, further comprising:

determining righting moment data for the floating platform based at least on the wind speed, wherein the coordination data comprises the righting moment data and the wind direction.

28. The method of claim 24, wherein the one or more factors comprise a yaw error.

29. The method of claim 28, wherein the predefined operation comprises a yawing operation.

30. The method of claim 29, wherein the coordination data comprises one of: the yaw error, righting moment data for the floating platform that is based at least on the yaw error, and tilt data and roll data for the floating platform.

* * * * *